US006983252B2

(12) United States Patent
Matheson et al.

(10) Patent No.: US 6,983,252 B2
(45) Date of Patent: Jan. 3, 2006

(54) INTERACTIVE HUMAN-MACHINE INTERFACE WITH A PLURALITY OF ACTIVE STATES, STORING USER INPUT IN A NODE OF A MULTINODE TOKEN

(75) Inventors: Caroline Elizabeth Matheson, Cambridge (GB); Steven Young, Cambridge (GB); Stephen Potter, Seattle, WA (US); Renaud J. Lecoeuche, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 10/138,154

(22) Filed: May 1, 2002

(65) Prior Publication Data

US 2002/0188441 A1 Dec. 12, 2002

(51) Int. Cl.
*G10L 15/22* (2006.01)
(52) U.S. Cl. ............... 704/275; 704/270.1; 704/251
(58) Field of Classification Search ............ 704/270.1, 704/275, 251
See application file for complete search history.

(56) References Cited

U.S. PATENT DOCUMENTS

| 5,103,498 | A | | 4/1992 | Lanier et al. ............... 395/68 |
| 6,021,403 | A | | 2/2000 | Horvitz et al. .............. 706/45 |
| 6,246,981 | B1 | * | 6/2001 | Papineni et al. ............ 704/235 |
| 6,314,402 | B1 | * | 11/2001 | Monaco et al. ............. 704/275 |
| 6,356,869 | B1 | * | 3/2002 | Chapados et al. .......... 704/275 |
| 6,505,162 | B1 | * | 1/2003 | Wang et al. ................ 704/275 |
| 6,829,603 | B1 | * | 12/2004 | Chai et al. .................... 707/5 |
| 2001/0023397 | A1 | * | 9/2001 | Tajima et al. .............. 704/231 |
| 2004/0085162 | A1 | * | 5/2004 | Agarwal et al. ........... 333/196 |

FOREIGN PATENT DOCUMENTS

EP 0 712 075 5/1996

OTHER PUBLICATIONS

Hanrieder, G. "Integration of a mixed-initiative dialogue manager into commercial ivr platforms."□□Interactive voice technology for telecommunications applications, 1998. IVTTA '98.□□Proceedings. 1998 IEEE 4th workshop. Sep. 29-30, 1998, pp. 77-82.*

Pieraccini, Roberto et al. "AMICA: the At and t mixed intiative conversational architecture."□□Eurospeech 1997. Rhodes-Greece Spet. 1997.*

* cited by examiner

*Primary Examiner*—Tālivaldis Ivars Šmits
*Assistant Examiner*—Matthew Kern
(74) *Attorney, Agent, or Firm*—Westman, Champlin & Kelly, P.A.

(57) ABSTRACT

A method and apparatus for controlling an interactive human-machine interface, which includes an input device and comprises a set of states. The set of states form a network through which data can be passed as a token. In a dialogue control unit, future states are assessed to determine allowable user inputs that may be received from the user. Each portion of the user input is stored in an associated node of the token, for use in the current state or in another of the active states. Each node is checked to see if it relates to the current state, and if so, then the portion of the user input stored in the node is processed.

28 Claims, 4 Drawing Sheets

INTERACTIVE HUMAN-MACHINE INTERFACE WITH A PLURALITY OF ACTIVE STATES, STORING USER INPUT IN A NODE OF A MULTINODE TOKEN

FIELD OF THE INVENTION

This invention relates to the management and control of interactive human-machine interfaces. Examples of interfaces that can be managed and controlled by the invention are interfaces controlled by speech recognition systems and information gathering web pages/browsers. A particular feature of the invention is to provide an efficient mechanism for providing mixed-initiative control for such systems. A mixed initiative approach is where the user is not constrained to answer the system's direct questions but may answer in a less rigid/structured manner.

BACKGROUND OF THE INVENTION

The problems associated with the current technology in this field are further detailed in the following description. Modern event-driven user interfaces provide a rich medium for interaction. The user often has a large set of available options which allows him to take the initiative in communicating with the machine. In many applications, however, it can be difficult to provide a large number of options without having complex and expensive devices to operate such applications. For example, speech-only interfaces, especially over the telephone, are highly constrained by the inability of current devices to accurately recognise more than a few keywords and phrases at a time. As a consequence, spoken dialogues for current commercial systems are typically implemented as flow charts in which each question and answer are explicitly scripted. This explicit "finite-state network" control of dialogue allows the range of possible inputs at any point in time to be carefully controlled and thereby allows robust and useable dialogues to be built. A secondary benefit of the "finite-state network" approach is that it has been used for many years in interactive voice response (IVR) applications and it is therefore familiar to a substantial existing developer community.

However, without extensive application-dependent handcrafting of the dialogues, the use of explicit finite state control results in applications that are heavily system directed and which prevent the user from taking any initiative. Applications built this way are typically inflexible and expensive to develop. Dialogues are long and tedious and frequent users are frustrated by the need to navigate a long and immutable sequence of questions and answers.

A further example that relates to the invention is the interface associated with browsing and data input through web sites on the Internet. The system already exists that is natural to use with the aid of links between relevant sites but as a user interacts with the available pages he may be required to provide certain details in order to achieve certain results or obtain required information. In moving among web pages, perhaps via a relevant link, individual details of information may be requested by each page. This process of having to enter multiple details in numerous places can be tedious, inconvenient and prove to be an inefficient use of time.

In many cases, the details could usefully be gathered in a single interaction and carried forward to the subsequent choices of sites to reduce the quantity of individual entries that may need to be given. If, however, the user notices and corrects a mistake in the details, this information could be passed back to the previous pages visited where the data was required and/or originally entered.

There is, therefore, a requirement to provide interfaces which allow for premature delivery of information to reduce the frequently tedious nature of current human machine interfaces. In addition, it is necessary to be able to "backtrack" when an incorrect sequence has been followed. An inexperienced user may be guided through a rigid, predetermined sequence of questions which require specific answers. However, the application ought to be able to be used in a more flexible and concise manner by those users with prior knowledge of the dialogue. Ideally, the interface should allow the presentation of details in advance of them being requested. Meanwhile the application must be efficient, simple and intuitive to program and maintain the robust nature of the "finite-state network" approach as for speech only interfaces finite-state control is essential to constrain the range of inputs that can be recognised at any one time.

SUMMARY OF THE INVENTION

According to the present invention there is provided a method for controlling an interactive human-machine interface including an input device and comprising a set of states which form a network through which data can be passed via a token, the data comprising information received from a user, the activities of the system and the user being categorised as system and user moves, with system and user moves being stored at each state, the method comprising the steps of:

assessing future active states to determine allowable information that can be received from a user;

receiving information from a user;

checking each received information item to see if it lies within the currently active states;

determining the course of action for each information item on the basis that:

if it is current state information, processing the information;

if it is information that will be required in a later, but currently active state, carrying the data forward until the appropriate state is reached where the data can be processed;

if it is denied and/or corrected information from an earlier state, or if no information is recognised for the current state then choosing to return to a previously known state; and returning to the assessing step until a path through the network has been achieved.

The human-machine interface may comprise a web browser or a speech recognition system.

The invention also provides a method as defined above, wherein the data further comprises confidence values associated with the information so that the system can determine when a piece of that information is known or if it needs to be confirmed. The method may further comprise the steps:

determining which states are active, prior to ascertaining what constitutes allowable information;

priming the input device by setting up the associated interpretation grammar for each future active state that may represent allowable information and each previous state which has carried information forward, the interpretation grammar being for answers associated with allowable system moves which request information from the current and future active states such as "ask" and "pre-ask", and user moves such as, "deny", "accept" and "correct" which are responses to system moves which confirm information (from current or previous states);

generating a prompt for required current information and/or confirmation for data that is associated with any previous or future states that are not known, prior to receiving data; and wherein the determining the course of action step for each information item, further comprises the criteria of:

if it is current state information, assessing its confidence value, determining whether confirmation is required and if it is then either issuing an explicit confirm or passing forward this confirmation requirement to the next state where an implied confirm may be issued along with the relevant system move;

if a denial and/or correction is issued by the user and received by the system then choosing to return to a previously known state;

if the system cannot interpret the data then choosing to return to previously known state and reducing the range of active states.

The invention also provides a system for controlling an interactive human-machine interface including an input device and comprising a set of states which form a network through which data can be carried via a token, the data comprising information received from a user, the activities of the system and the user being categorised as system and user moves, with system and user moves being stored at each state, the system comprising:

a means for assessing future active states to determine allowable information that can be received from a user;

a means for receiving information from a user;

a means for checking each received information item to see if it lies within the currently active states;

a means for determining the course of action for each information item on the basis that:

if it is current state information, processing the information;

if it is information that will be required in a later, but currently active state, carrying the data forward until the appropriate state is reached where the data can be processed;

if it is denied or corrected information from an earlier state, or if no information is recognised for the current state then choosing to return to a previously known state; and a means for returning to the assessing step until a path through the network has been achieved.

The system of the invention may comprise a web browser and/or a speech recognition system.

The invention also provides a system which comprises a speech recognition system, wherein the data further comprises confidence values associated with the information so that the system can determine when a piece of that information is known or if it needs to be confirmed. The system may further comprise:

a means for determining which states are active, prior to ascertaining what constitutes allowable information;

a means for priming the input device by setting up an associated interpretation grammar for each future active state that may represent allowable information and each previous state which has carried information forward, the interpretation grammar being for answers associated with allowable system moves which request information from the current and future active states such as "ask" and "pre-ask", and user moves such as, "deny", "accept" and "correct" which are responses to system moves which confirm information (from current or previous states);

a means for generating a prompt for required current information and/or confirmation for data that is associated with any previous or future states that are not known, prior to receiving data; and wherein the means for determining the course of action for each information item, further comprises the criteria of:

if it is current state information, assessing its confidence value, determining whether confirmation is required and if it is then either issuing an explicit confirm or passing forward this confirmation requirement to the next state where an implied confirm may be issued along with the relevant system move;

if a denial is issued by the user and received by the system then choosing to return to a previously known state;

if the system cannot interpret the data then choosing to return to previously known state and reducing the range of active states.

The invention takes the approach that a dialogue (either spoken or written) can be viewed as a sequence of state transitions in which each state represents a piece of information that is needed by the system. A user in prior art systems is asked a sequence of questions in strict state order to elicit the required information and he or she will have to provide answers in the order given. If any deviation or relaxation of this ordering is required, then the dialogue designer must anticipate the variations and allow for them explicitly by adding more states and transitions.

Using the invention, future states as well as the current state are activated, and information from previous states may also be used. When asked about the current state, a user may include extra information in the answer which is pertinent to the previous information or which will be required in the future. This additional unsolicited information is carried forward until the appropriate state is reached at which point it is processed. The invention can also be applied to allow implicit confirmation to be supported.

DETAILED DESCRIPTION OF THE PREFERRED EMBODIMENTS

Figure 1:
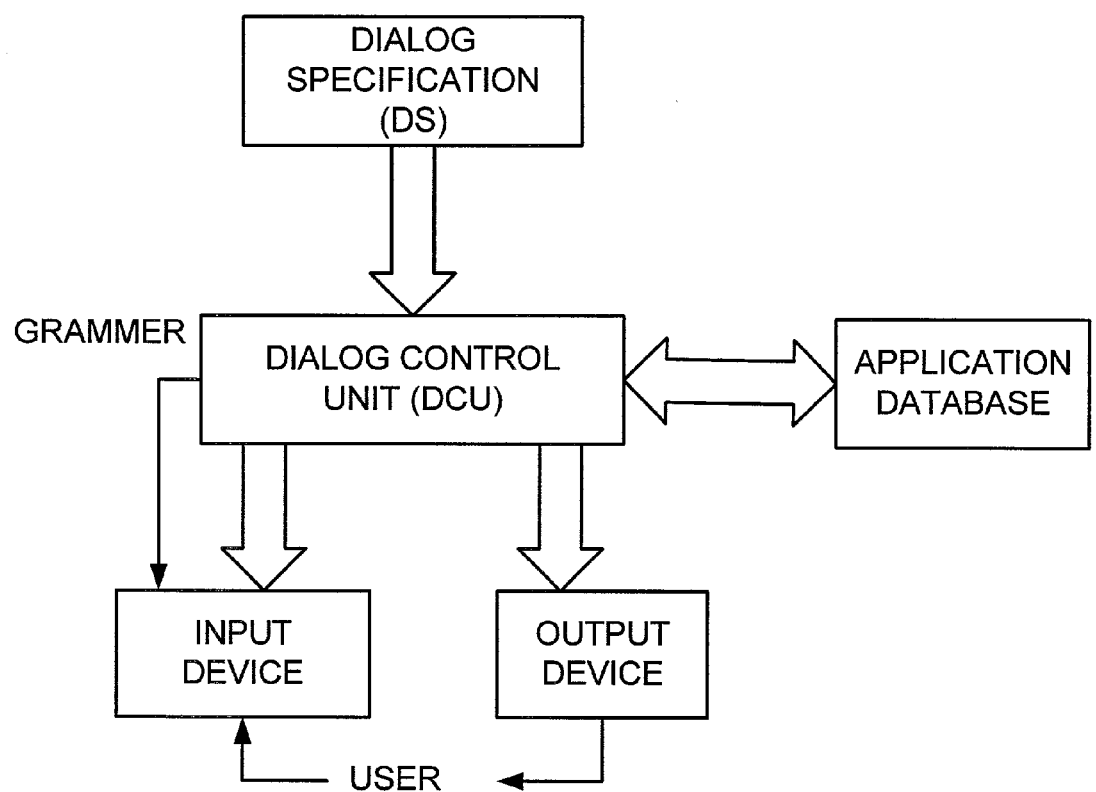
FIG. 1 is a block diagram of the human-machine interface.

FIG. 1 shows a block diagram of a human-machine interface incorporating the invention. The dialogue control unit (DCU) interprets a dialogue specification (DS), typically stored as an XML document. The DCU also interfaces to the application database which supports the required transactions (e.g. to get information, register an e-purchase, etc). The DS contains a representation of a finite state network defining a sequence of question/answer exchanges. Each question/answer involves priming an input device (e.g. a speech recogniser) with an interpretation grammar and then outputting a prompt to the output device. The purpose of priming the input device with a grammar is to constrain the range of user inputs to just those required. This is especially important when the input device is intrinsically unreliable as in the case of a speech recogniser. In practice, each state must do more than just execute a single question/answer cycle. For example, the user may mumble or ask for help, the user's answer may be uncertain and confirmation/ clarification questions must be asked. It is all of these issues which make robust speech-based dialogues extremely complex.

Figure 2:
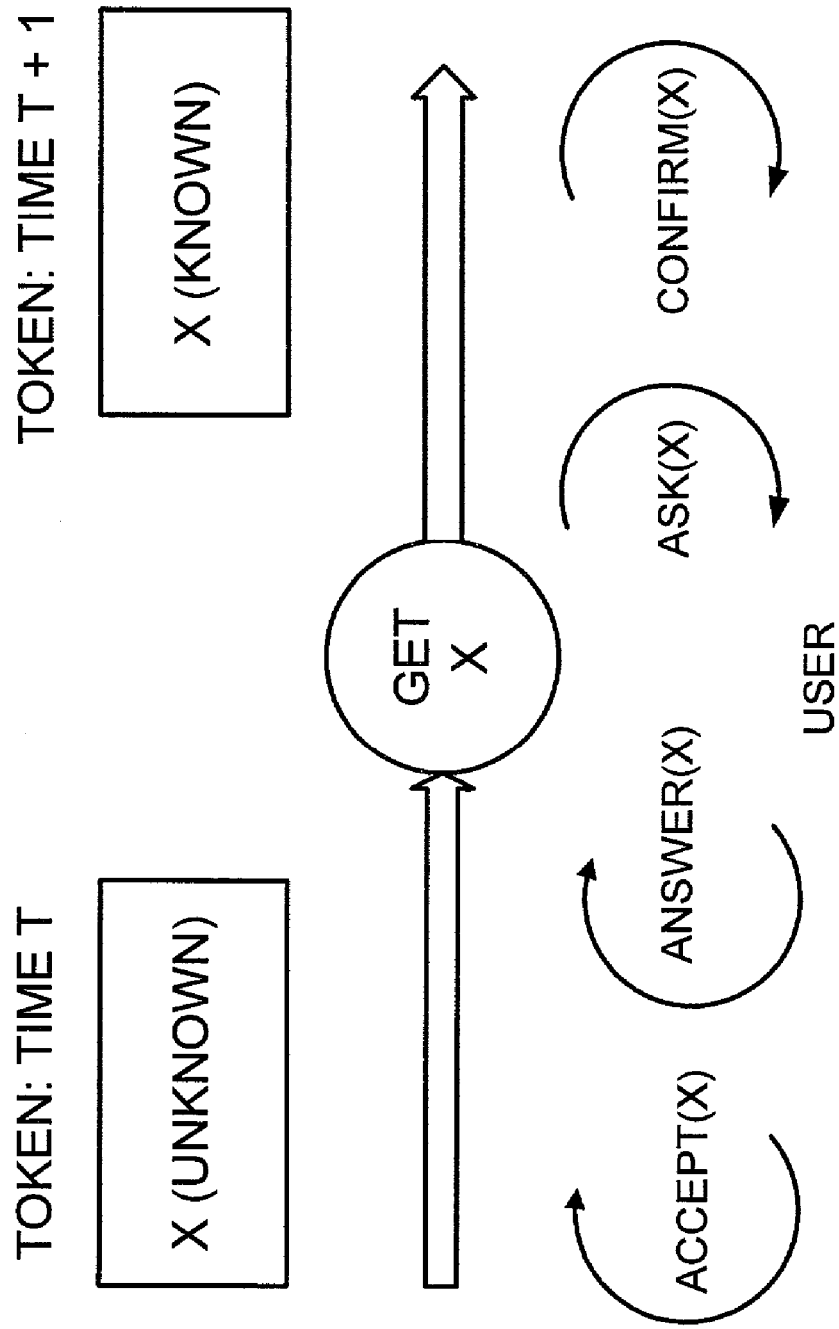
FIG. 2 shows the basic state execution in terms of dialogue moves.

To enable the invention to function effectively, an implementation should preferably provide the following features:

a) all interpretations of user inputs which involve the invention must be consistent with one and only one subsequent state sequence. This ensures that the system can continue the dialogue in a manner that is functionally equivalent to the case where the user has supplied information when only explicitly prompted to do so. For example, taking the state layout represented in FIG. 3, while the system is in state x, user inputs should be constrained to follow the paths out at state x. That is, input on x can be supplemented by input on y or z, but not by input on both y and z at once, since y and z do not occur along a single path in this network.

b) When an error occurs (eg because the interpretation of the user's input was incorrect), then it should be possible to backtrack to a previous known state and continue. This backtracking can reset all system beliefs back to their earlier values. However, the history should be preserved so that the future attempts to elicit the required data can take account of earlier failures.

c) The range at future states which fall within the scope of the mechanism should be dynamically adjustable so that the system can adapt to changing performance and environmental conditions.

d) The support for the invention should not compromise modularity. Thus, if a state x has a follow state y representing the acquisition of a complex data item (eg a data, a credit card number, etc), then it must be possible to design and implement y independently without prior knowledge of x.

e) In the implementations described here, the support for the above features is provided by two mechanisms, the first of which is a token passing mechanism. Rather than assigning data directly to global memory a system has been devised whereby tokens are passed through the network of states. The token is a facility used to store the system's beliefs. Each token has a hierarchical structure of nodes, each node can be associated with one or more states of the network. As each state is entered by a token, the state attempts to find a value for the data at the appropriate node on the token. (Non-terminal nodes of the token may be associated with states which represent subdialogs; a subdialog is itself a network of states which typically encapsulates the means to obtain a composite data item.) Once the status of this data item is regarded as known then the token leaves the current state and moves on to the next one.

f) It is the use of these tokens that allows the system to back-track to an earlier state. Whenever a state is entered, the token contents are audited such that the token can be reset to that state of affairs at any time in the future. Tokens also provide the transport mechanism for the invention g) The second mechanism that supports the invention is the concept of dialogue moves. Each state contains a set of system and user dialogue moves, these provide the primitive building blocks of the dialogue. A system move is responsible for priming the input data recogniser with an interpretation grammar from its associated user moves and generating the output prompt. In a speech controlled system the interpretation grammar consists of various utterances and phrases, each of which represents one or more user moves. A user move is triggered by some part of the user's input matching some part of the interpretation grammar.

h) Examples of system moves are ask (x), which primes the input device and generates a prompt inviting the user to speak, confirm (x), which is used if the confidence of the received data is not very high. (The confidence value is assumed to be a value which represents how 'confident' is the system that it has correctly recognised an item. In typical systems, this is computed from a combination of the values returned from the acoustic and language models.) Examples of the form of ask and confirm moves might be as follows. In a travel booking application, for example, with the city of departure corresponding to data item x:

ask (DepartureCity) could hold the prompt: "from which city do you want to leave?" and be associated with the user move answer (DepartureCity) which will prime the input device with its grammar (see below); and confirm (DepartureCity) could hold the prompt "did you say $DepartureCity" (where $DepartureCity is a variable which holds the value for the data item) and be associated with accept (DepartureCity) and deny (DepartureCity) user moves which will primpt the input device with their grammars (as in the next example).

i) Examples of user moves are answer(x), which provides data for the node, accept (x), which sets the status of this data to be grounded, deny (x), which causes the system to backtrack to a previously known state. For example:

answer(DepartureCity) may contain a grammar which permits user input of one of a number of different cities, eg London, Paris or Seattle;

accept (DepartureCity) may contain a grammar simply of "yes" or other forms of acceptance, and/or the current value of the DepartureCity token field; deny (DepartureCity) may contain a grammar simply of "no" or some other form of negation, and optionally a correction of the city in question.

j) FIG. 2 illustrates the basic operation of a state in terms of system and user moves. When the token first enters the state for node item x, the value of x is unknown. The state therefore generates an "ask (x)" system move to prime the input device and generate a prompt inviting the user to speak. If the user cooperates by supplying an answer, an "answer (x)" user move is generated. This causes a value to be assigned to x and if its confidence is not very high, the state then issues a "confirm (x)" system move. If the user confirms the value, an "accept (x)" user move is triggered. This sets the status of x to be known (or grounded) and the token leaves the state.

k) The invention allows multiple states to be activated at one time. Not only is the current state considered but extra data may be provided which will be required later. Such data is transported forward until the appropriate state in the network is reached when it is automatically processed. For example, in a travel booking application, if the current state pertains to the departure city and the following state to the arrival city, the user may provide data relevant to his arrival city if it is active, by saying, for instance, "I want to go from Seattle to London". In this case, the "to London" portion of his utterance represents data associated with the following state (that of the arrival city), and while it is permitted by the input grammars, the data will not be processed until the system enters the arrival city state.

In addition, this facility allows implicit confirmation to be achieved to further enhance the efficiency at the dialogue.

Figure 3:
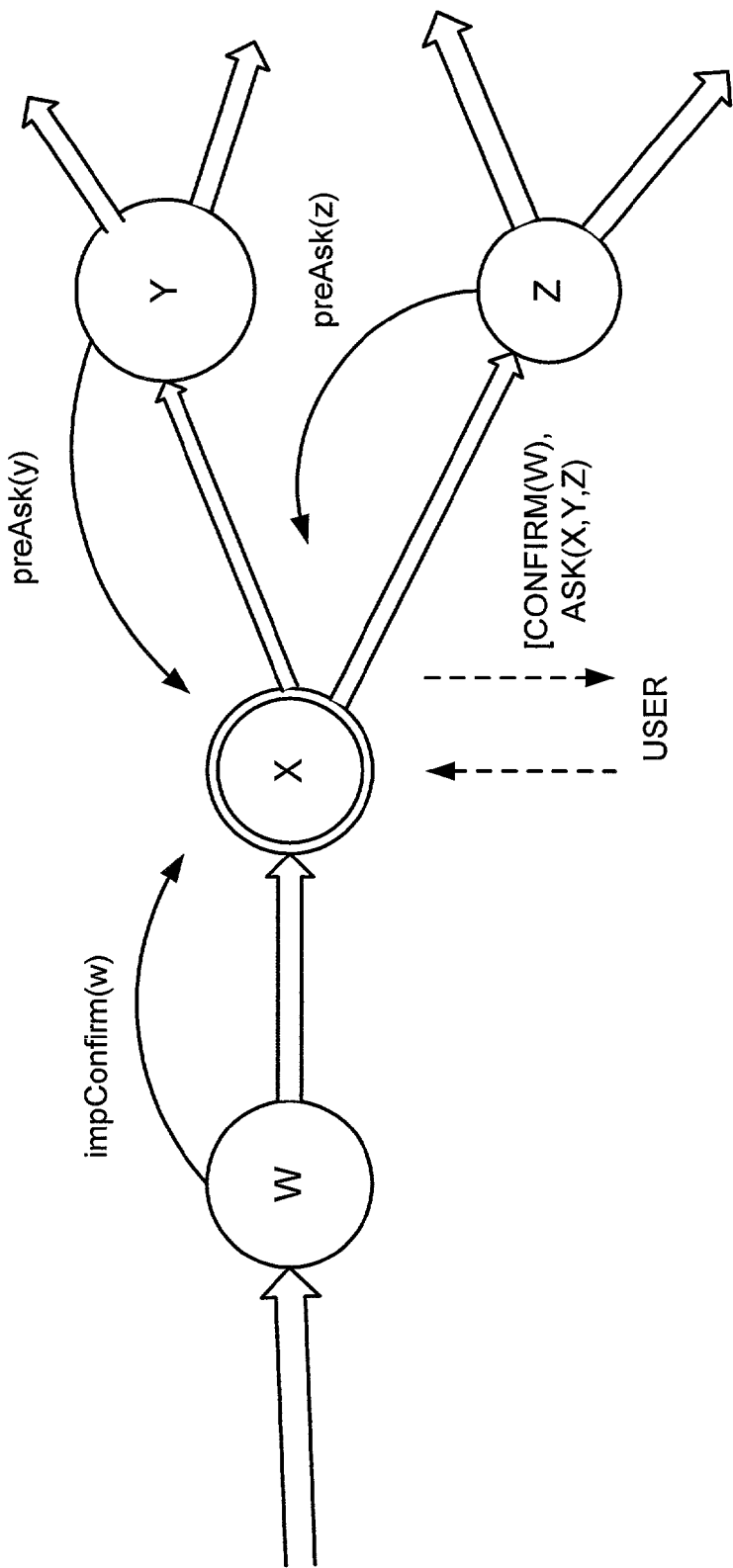
FIG. 3 is a diagrammatic representation of the invention.
Figure 4:
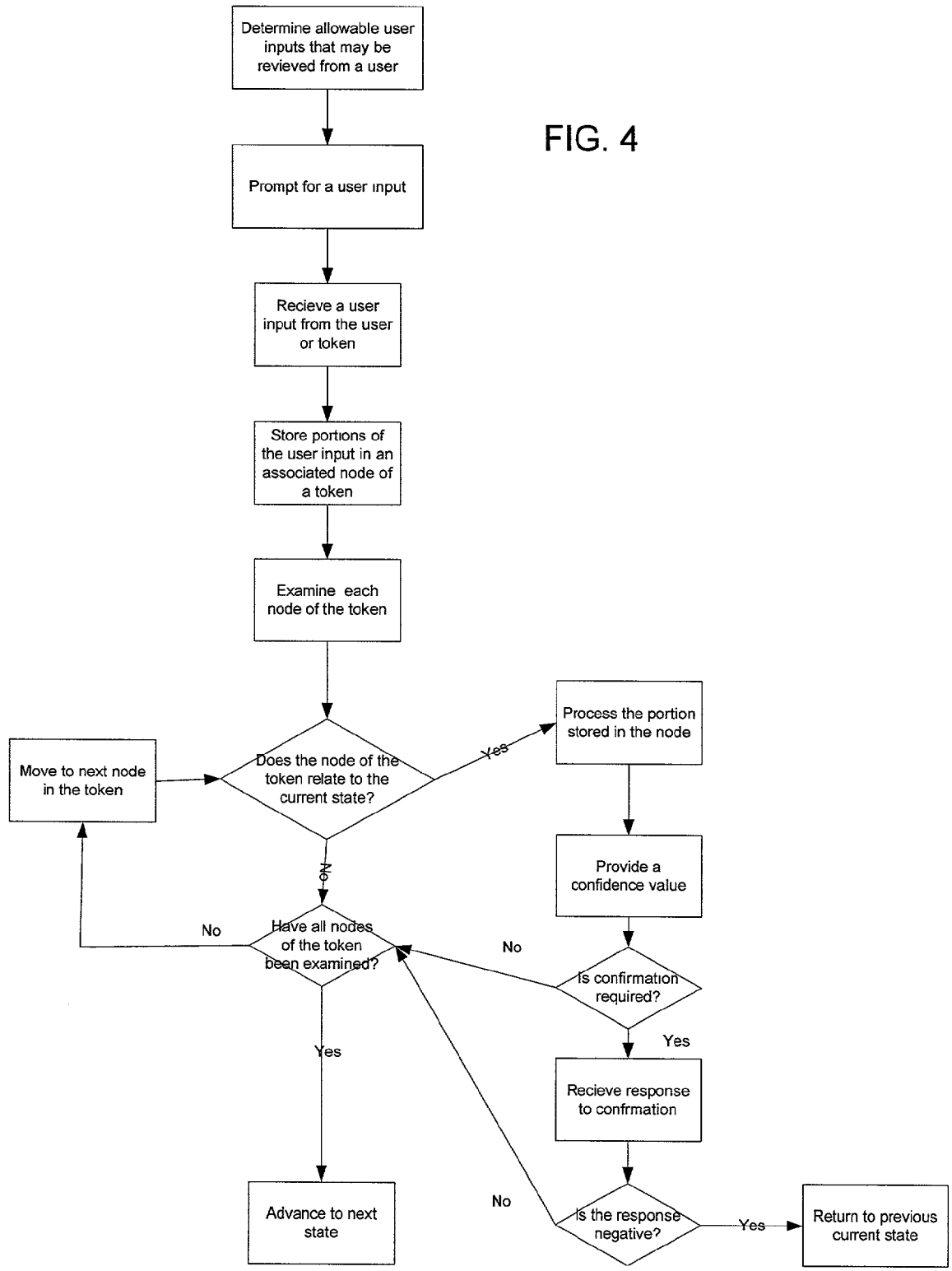
FIG. 4 is a flow diagram of one embodiment of the invention.

This will further reduce the frustration of an experienced user as fewer explicit confirmation statements will have to be presented. For example, in a travel booking application, if the confirm (DepartureCity) system move is transported into the ArrivalCity state where the ask (ArrivalCity) system move is generated, it is possible to combine the moves into a system utterance which both explicitly asks the arrival city and implicitly confirms the departure city. Given a value of "Paris" in the DepartureCity token field, the system is able to generate a prompt such as "You want to go from Paris to which city?"

l) The invention allows frequent users to "learn" the dialogue and hence streamline their response to it, this reduces time spent on the interaction. If the dialogue has been used before then it is simply a matter of anticipating the questions. However, if insufficient data is received or the utterances cannot be interpreted the user will be prompted for appropriate answers. The level of sophistication is dynamically altered to suit the user by changing the size of the "focus space". The "focus space" determines the range of active states. In the travel application example of the preceding paragraphs, if the current state is the departure city state and one of the following states is the arrival city state, the subsequent arrival state will only be activated if the focus space is sufficiently deep to include the arrival state. This depth is dynamically changeable: if mistakes are made or the level of confidence in the answers is particularly low, the depth may be decreased, reducing the number of active states and hence the number of possible responses. At limit, the base line model can be reinstated and the focus space will contain only the current state.

m) When the focus space incorporates future states the invention enables the current state to import system moves from future states and allows the token to convey system moves forward and execute them when suitable/convenient.

n) FIG. 3 illustrates a typical situation. The current state is x. The preceding state w gathered a value for itself but did not explicitly confirm it. Instead it generated a deferred "impConfirm" move which gets carried forward with the token waiting for an appropriate system move to attach itself to, typically an "ask" move. Before generating its own "ask move, state x imports "ask" moves from succeeding states. The grammars associated with these prefetched ask moves will be incorporated into the current ask grammar. Similarly, the yes/no and correction grammars associated with the "impconfirm" move will be incorporated. The net effect is that the user will be given a prompt of the form: "You want w. That is x?" and the constructed interpretation grammar will allow the user to respond with a simple deny such as "No", a deny and correction such as "No, w is . . . not . . . " or with a direct answer such as "x . . . is", or with information that might be used later as in "x is . . . and y is . . . ". When a deny move is triggered, the token backtracks carrying any correction move with it. When future moves are triggered, they get carried forward with the token until they reach their own state, at which time they are processed. Note that each token node is read-only to all states except the state to which it is linked. This enables a strict, full history to be maintained to allow the facility of back-tracking to be implemented.

o) An example system is written in C++ which uses the Microsoft XML parser (MSXML), the Microsoft JScript interpreter and the Microsoft Speech API. Each dialogue specification consists of XML pages, with certain elements containing embedded code in JScript. The dialogue specification is first parsed and converted to an internal tree representation, the tree is then scanned and a representation of the finite state machine is then built and subsequently executed. The token and its contents are maintained inside the JScript interpreter and are updated via calls from the system and directly by executing the user-defined script within the interpreter.

What is claimed is:

1. A method for controlling an interactive human machine interface, the interactive interface including an input device and comprising a plurality of states including a plurality of active states, having a range, of which one of the plurality of active states is a current state, the plurality of states forming a path through a network through which data can be passed, the method comprising the steps of:
   determining from the plurality of active states allowable user inputs that can be received from a user;
   receiving a user input from the user, the user input having at least one portion;
   storing a portion of the user input in an associated node of a token having a plurality of nodes;
   checking the plurality of nodes to determine if the node relates to the current state; and
   processing the portion of the user input associated with the node if the node relates to the current state.

2. The method of claim 1, further comprising the steps of:
   selecting a new current state from one of the plurality of active states; and
   passing the token to the new current state.

3. The method of claim 2, wherein the new current state is a later active state in the path.

4. The method of claim 2, wherein the new current state is a previous active state in the path.

5. The method of claim 1, wherein the human-machine interface is a web browser.

6. The method of claim 1, wherein the received user input is the token received from a previously current state.

7. The method of claim 1, further comprising the steps of:
   priming the input device for an associated interpretation grammar for each of the plurality of active states that may represent allowable user inputs;
   generating a prompt for a required current user input or a confirmation for the user input associated with any one of the plurality of active states; and
   for the portion of the user input that is for the current state:
      providing a confidence value for the portion of the user input; and
      determining if a confirmation is required for the portion of the user input.

8. The method of claim 7, further comprising the steps of:
   if confirmation is required:
      receiving a response to the confirmation;
      returning to a previously current state if the response is a negative response; and
      returning to a previously current state and reducing the range of the plurality of active states if the response is not recognized.

9. The method of claim 8, wherein the confirmation is inputted by the user.

10. The method of claim 8, wherein the confirmation is implied.

11. The method of claim 8, wherein the negative response is a denial.

12. The method of claim 8, wherein the negative response is a correction.

13. The method of claim 8, wherein the negative response is a denial and a correction.

14. The method of claim 1, wherein the human-machine interface is a speech recognition system.

15. An interactive human-machine interface controller comprising:
   a dialogue control unit;
   a user input device connected to the dialogue control unit;
   a user output device connected to the dialogue control unit;
   an application program operatively connected with the dialogue control unit;
   a dialogue specification;
   a plurality of states including a plurality of active states, having a range, of which one of the plurality of active states is a current state, the plurality of states forming a path through a network through which data can be passed; and
   wherein the dialogue control unit is configured to:
      determine from the plurality of active states allowable user inputs that can be received from a user;
      receive a user input from the user, the user input having at least one portion;
      store a portion of the user input in an associated node of a token having a plurality of nodes;
      check the plurality of nodes to determine if the node relates to the current state; and
      process the portion of the user input associated with the node if the node relates to the current state.

16. The interactive human-machine interface controller of claim 15, wherein the dialogue control unit is further configured to:
   select a new current state from one of the plurality of active states; and
   pass the token to the new current state.

17. The interactive human-machine interface controller of claim 16, wherein the new current state is a later active state in the path.

18. The interactive human-machine interface controller of claim 16, wherein the new current state is a previous active state in the path.

19. The interactive human-machine interface controller of claim 15, wherein the user input device is a web browser.

20. The interactive human-machine interface controller of claim 15, wherein the human-machine interface is a speech recognition system.

21. The interactive human-machine interface controller of claim 15, wherein the received user input is the token received from a previously current state.

22. The interactive human-machine interface controller of claim 15, wherein the dialogue control unit is further configured to:
   prime the input device for an associated interpretation grammar for each of the plurality of active states that may represent allowable user inputs;
   generate a prompt for a required current user input or a confirmation for the user input associated with any one of the plurality of active states; and
   for the portion of the user input that is for the current state:
      provide a confidence value for the portion of the user input; and
      determine if a confirmation is required for the portion of the user input.

23. The interactive human-machine interface controller of claim 22, wherein the dialogue control unit is further configured to:
   if confirmation is required:
      receive a response to the confirmation;
      return to a previously current state if the response is a negative response; and
      return to a previously current state and reducing the range of the plurality of active states if the response is not recognized.

24. The interactive human-machine controller of claim 23, wherein the confirmation is inputted by the user.

25. The interactive human-machine controller of claim 23, wherein the confirmation is implied.

26. The interactive human-machine controller of claim 23, wherein the negative response is a denial.

27. The interactive human-machine controller of claim 23, wherein the negative response is a correction.

28. The interactive human-machine controller of claim 23, wherein the negative response is a denial and a correction.

* * * * *